United States Patent
Kim (10) Patent No.: US 9,739,332 B2
(45) Date of Patent: Aug. 22, 2017

(54) DAMPING FORCE CONTROLLING SHOCK ABSORBER

(71) Applicant: MANDO CORPORATION, Pyeongtaek-si, Gyeonggi-do (KR)

(72) Inventor: Eun Joong Kim, Yongin-si (KR)

(73) Assignee: MANDO CORPORATION, Pyeongtaek-shi, Gyeonggi-do (KR)

( * ) Notice: Subject to any disclaimer, the term of this patent is extended or adjusted under 35 U.S.C. 154(b) by 0 days.

(21) Appl. No.: 15/151,406

(22) Filed: May 10, 2016

(65) Prior Publication Data

US 2016/0333959 A1    Nov. 17, 2016

(30) Foreign Application Priority Data

May 11, 2015    (KR) .................. 10-2015-0065348

(51) Int. Cl.
  *F16F 9/512*    (2006.01)
  *F16F 9/348*    (2006.01)
  *F16F 9/18*     (2006.01)

(52) U.S. Cl.
  CPC .......... *F16F 9/5126* (2013.01); *F16F 9/3481* (2013.01); *F16F 9/3482* (2013.01); *F16F 9/185* (2013.01); *F16F 2228/066* (2013.01)

(58) Field of Classification Search
  CPC ....... F16F 9/3481; F16F 9/3482; F16F 9/5126
  See application file for complete search history.

(56) References Cited

U.S. PATENT DOCUMENTS

| | | | | |
|---|---|---|---|---|
| 4,953,671 A * | 9/1990 | Imaizumi | ............... | F16F 9/512 188/266.3 |
| 5,404,973 A * | 4/1995 | Katoh | ............... | F16F 9/468 188/266.3 |
| 5,975,258 A * | 11/1999 | Nezu | ............... | F16F 9/348 188/266.5 |
| 7,407,044 B2 * | 8/2008 | Jee | ............... | F16F 9/465 188/266.6 |
| 7,458,448 B2 * | 12/2008 | Katou | ............... | F16F 9/3485 188/282.6 |
| 7,997,394 B2 * | 8/2011 | Yamaguchi | ............... | F16F 9/465 188/266.2 |
| 8,651,252 B2 * | 2/2014 | Katayama | ............... | F16F 9/3484 188/282.6 |
| 8,794,405 B2 * | 8/2014 | Yamashita | ............... | B60G 13/08 188/317 |

(Continued)

*Primary Examiner* — Vishal Sahni
(74) *Attorney, Agent, or Firm* — McDermott Will & Emery LLP (57) ABSTRACT

A damping force controlling shock absorber includes: retainers respectively connected to top and bottom surfaces of the piston, a connection passage communicating with a main passage being formed to vertically penetrate the retainers; housings respectively disposed on corresponding opposite surfaces of the retainers to form pilot chambers on mutual corresponding surfaces of the housings, a pilot passage being formed to vertically penetrate the housings so as to communicate the pilot chambers with the outside; pilot valves that are in close contact with the connection passage between the retainers and the housings to generate a main damping force; and a spool guide that penetrate and connects to the retainers, the housings, and the pilot valves and guides the spool in a state of surrounding the outside of the spool.

7 Claims, 5 Drawing Sheets

(56) References Cited

U.S. PATENT DOCUMENTS

| | | | | |
|---|---|---|---|---|
| 2003/0132073 A1* | 7/2003 | Nakadate | ............. | F16F 9/3214 |
| | | | | 188/282.2 |
| 2005/0279597 A1* | 12/2005 | Yamaguchi | ............. | F16F 9/348 |
| | | | | 188/322.13 |
| 2016/0221411 A1* | 8/2016 | Kim | ......................... | F16F 9/48 |
| 2016/0223047 A1* | 8/2016 | Kim | ..................... | F16F 9/5165 |

* cited by examiner

DAMPING FORCE CONTROLLING SHOCK ABSORBER

CROSS-REFERENCE(S) TO RELATED APPLICATION

This application claims the benefit of Korean Patent Application No. 10-2015-0065348, filed on May 11, 2015, in the Korean Intellectual Property Office, the disclosure of which is incorporated herein in its entirety by reference.

BACKGROUND OF THE INVENTION

Field of the Invention

The present invention relates to a damping force controlling shock absorber, and more particularly, to a damping force controlling shock absorber which is capable of forming a hard passage through connection of disks where slits are formed, and is capable of generating a soft damping force by using four passages formed in compression and rebound stroke directions of a spool guide, thereby simplifying a passage structure, reducing production dispersion of shock absorbers, and increasing productivity of shock absorbers.

Description of the Related Art

In general, a shock absorber is installed in means of transportation, such as automobile or the like, and improves ride comfort by absorbing and damping a vibration or shock from a road surface during driving.

Such a shock absorber includes a cylinder and a piston rod installed to be compressible and extendable within the cylinder. The cylinder and the piston rod are installed in a vehicle body, wheels, or axles.

A shock absorber, a damping force of which is set to be low, can improve ride comfort by absorbing a vibration caused by unevenness of a road surface during driving. On the contrary, a shock absorber, a damping force of which is set to be high, can improve steering stability by suppressing a change in a posture of a vehicle body.

Therefore, there has been developed a damping force controlling shock absorber in which a damping force controlling valve capable of appropriately adjusting damping force characteristics is mounted on one side of the shock absorber, such that the damping force characteristics are appropriately adjusted to improve ride comfort or steering stability according to a road surface and a driving condition.

In general, such a conventional damping force controlling shock absorber has a structure to select a hard passage and a soft passage by selectively opening and closing a plurality of passages formed in a spool guide while changing a position of a spool.

That is, a hard damping force or a soft damping force may be selectively generated by selectively adjusting an opened/closed state of the hard passage and the soft passage formed in the spool guide.

However, in the conventional damping force controlling shock absorber, since the hard passage and the soft passage are individually formed by using the plurality of passages formed in the spool guide, the structure of the shock absorber becomes complicated and dispersion may occur during mass production. Due to the complicated structure, a manufacturing cost of the shock absorber may increase.

As the prior document related to the present invention, Korean Patent Application Laid-Open No. 10-1998-0002962 (Mar. 30, 1998) discloses a damping force controlling buffer valve.

SUMMARY OF THE INVENTION

An aspect of the present invention is directed to provide a damping force controlling shock absorber which is capable of forming a hard passage through connection of disks where slits are formed, and is capable of generating a soft damping force by using four passages formed in compression and rebound stroke directions of a spool guide, thereby simplifying a passage structure, reducing production dispersion of shock absorbers, and increasing productivity of shock absorbers.

According to an embodiment of the present invention, there is provided a damping force controlling shock absorber, which includes a piston rod configured to perform compression and rebound strokes within a cylinder, a piston connected to the piston rod to divide the cylinder into a compression chamber and a rebound chamber, a main passage being formed to vertically penetrate the piston, and a solenoid configured to elevate a spool by a magnetic force between the piston rod and the piston, the damping force controlling shock absorber including: retainers respectively connected to top and bottom surfaces of the piston, a connection passage communicating with the main passage being formed to vertically penetrate the retainers; housings respectively disposed on corresponding opposite surfaces of the retainers to form pilot chambers on mutual corresponding surfaces of the housings, a pilot passage being formed to vertically penetrate the housings so as to communicate the pilot chambers with the outside; pilot valves that are in close contact with the connection passage between the retainers and the housings to generate a main damping force; and a spool guide that penetrate and connects to the retainers, the housings, and the pilot valves and guides the spool in a state of surrounding the outside of the spool, wherein slits are formed to vertically penetrate the pilot valves such that a fluid passing through the connection passage and the pilot chamber is discharged to the outside in a hard mode, and bypass passages are formed in the spool guide such that a fluid passing through the slits and the pilot chamber is discharged to the outside through the inside of the spool guide and a valve passage in a soft mode.

The bypass passages may include: a first compression passage formed in a direction of the compression chamber with respect to the piston such that a fluid passing through the pilot chamber is introduced into the spool guide in the rebound stroke; a second compression passage formed such that a fluid passing through the first compression passage and the inside of the spool guide is discharged to the outside through the valve passage; a first rebound passage formed in a direction of the rebound chamber with respect to the piston such that a fluid passing through the pilot chamber is introduced into the spool guide in the compression stroke; and a second rebound passage formed such that a fluid passing through the first rebound passage and the inside of the spool guide is discharged to the outside through the valve passage.

The second compression passage and the second rebound passage may be formed between the first compression passage and the first rebound passage.

The pilot valves may include: a low disk that is in close contact with the connection passage in a state in which the spool guide penetrates and connects to the low disk; a primary pilot disk that is in close contact with the low disk in a state in which the spool guide penetrates and connects to the primary pilot disk, first slits being vertically formed along an edge of the primary pilot disk which is spaced apart from the low disk; a secondary pilot disk that is in close contact with the primary pilot disk in a state in which the spool guide penetrates and connects to the secondary pilot disk, second slits being vertically formed along an edge of the secondary pilot disk so as to communicate with the first slits in the hard mode; and a main disk that is in close contact with the secondary pilot disk in a state in which the spool guide penetrates and connects to the main disk, third slits being vertically formed along an edge of the main disk so as to communicate with the second slits and the pilot chamber in the hard mode.

The first slits and the third slits may be alternately formed with respect to the secondary pilot disks, and the second slits guide a fluid moved through the first slits toward a side and then guide the fluid to third slits.

The damping force controlling shock absorber may further include sealing members provided between the pilot valves and the housings such that the sealing members are installed movably in a state of blocking the pilot chambers, wherein an introduction passage is formed in the sealing members such that a fluid passing through the slits is moved to the pilot chamber.

The damping force controlling shock absorber may further include auxiliary valves connected to the corresponding opposite surfaces of the housings, wherein the auxiliary valves are in close contact with the slits and are opened in the hard mode such that the fluid passing through the slits is discharged to the outside.

DETAILED DESCRIPTION OF EMBODIMENTS

Hereinafter, preferred embodiments of the present invention will be described in detail with reference to the accompanying drawings.

The advantages and features of the present invention and methods for achieving them will become more apparent from the following embodiments that are described in detail in conjunction with the accompanying drawings.

However, the present invention is not limited to the following embodiments and may be embodied in various forms. These embodiments are provided so that this disclosure will be thorough and complete, and will fully convey the scope of the invention to those skilled in the art. The scope of the present invention is defined by the appended claims.

In addition, detailed descriptions of well-known technologies or the like will be omitted since they would unnecessarily obscure the subject matters of the present invention.

Figure 1:
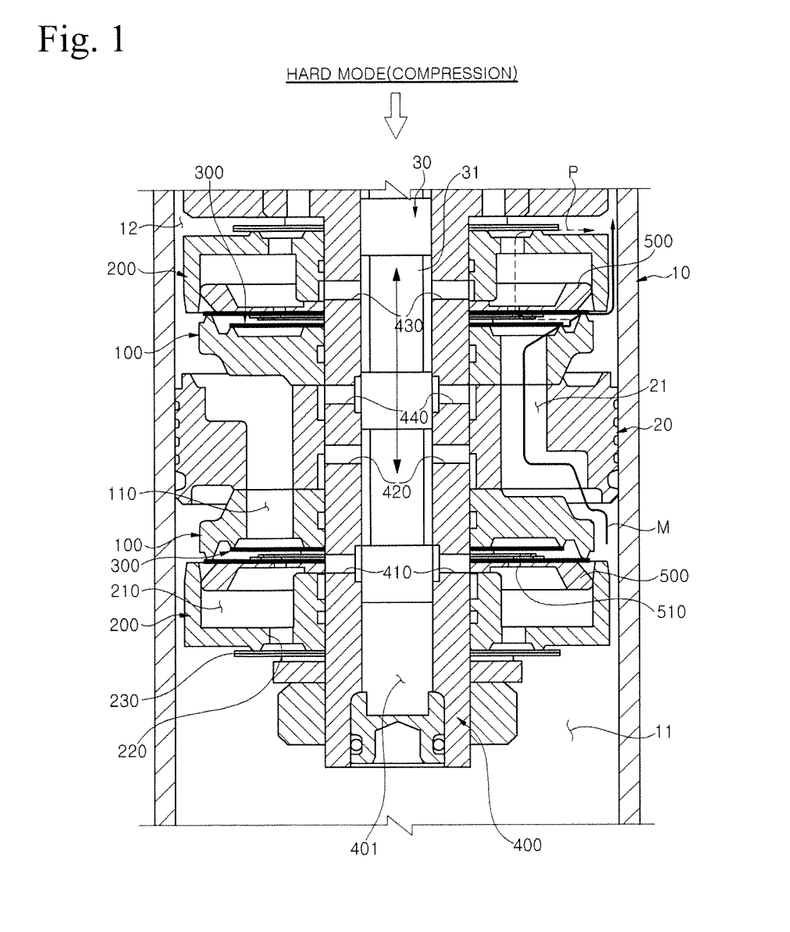
FIG. 1 is a front cross-sectional view illustrating a compression stroke state in a hard mode of a damping force controlling shock absorber according to the present invention.
Figure 2:
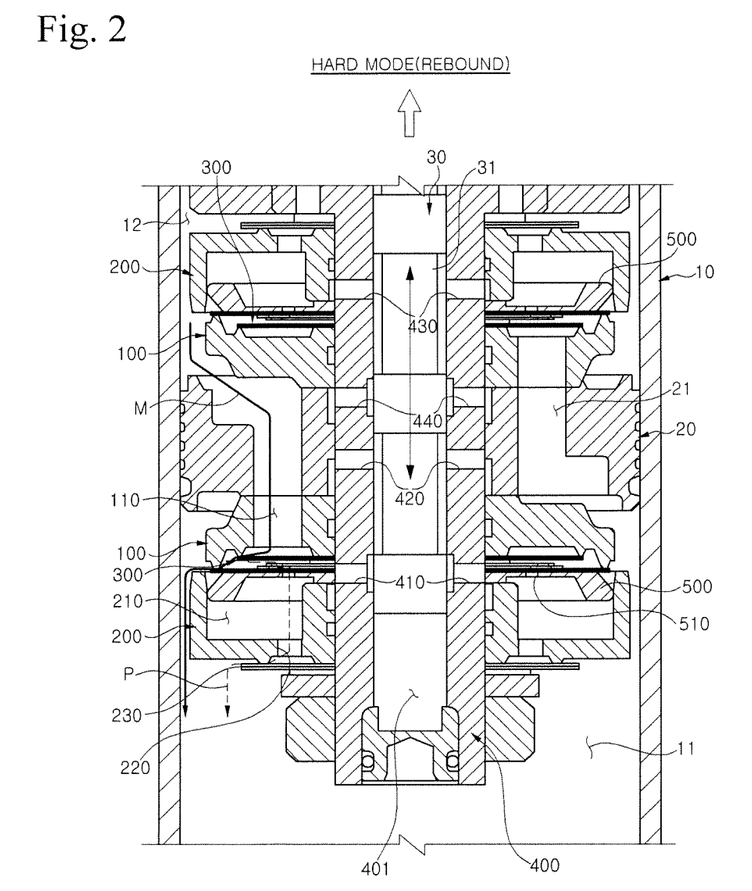
FIG. 2 is a front cross-sectional view illustrating a rebound stroke state in the hard mode of the damping force controlling shock absorber according to the present invention.

FIG. 1 is a front cross-sectional view illustrating a compression stroke state in a hard mode of a damping force controlling shock absorber according to the present invention, and FIG. 2 is a front cross-sectional view illustrating a rebound stroke state in a hard mode of a damping force controlling shock absorber according to the present invention.

Figure 3:
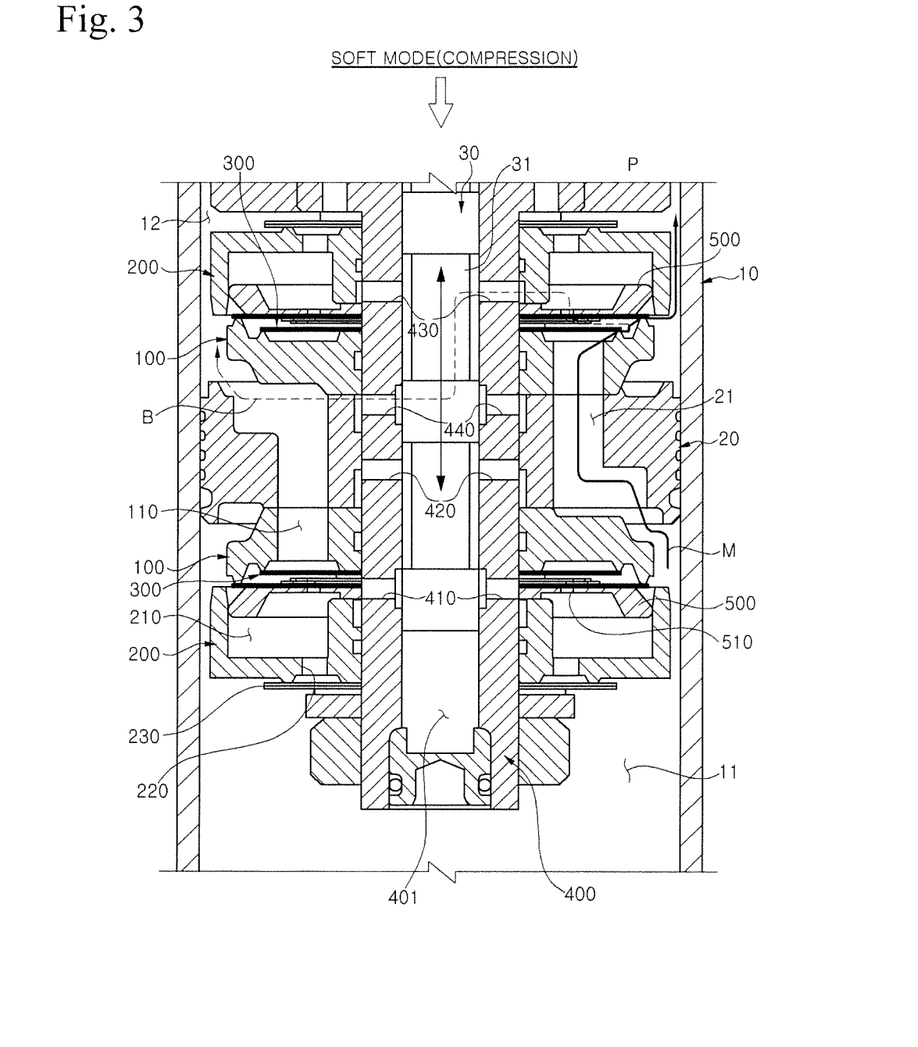
FIG. 3 is a front cross-sectional view illustrating a compression stroke state in a soft mode of the damping force controlling shock absorber according to the present invention.
Figure 4:
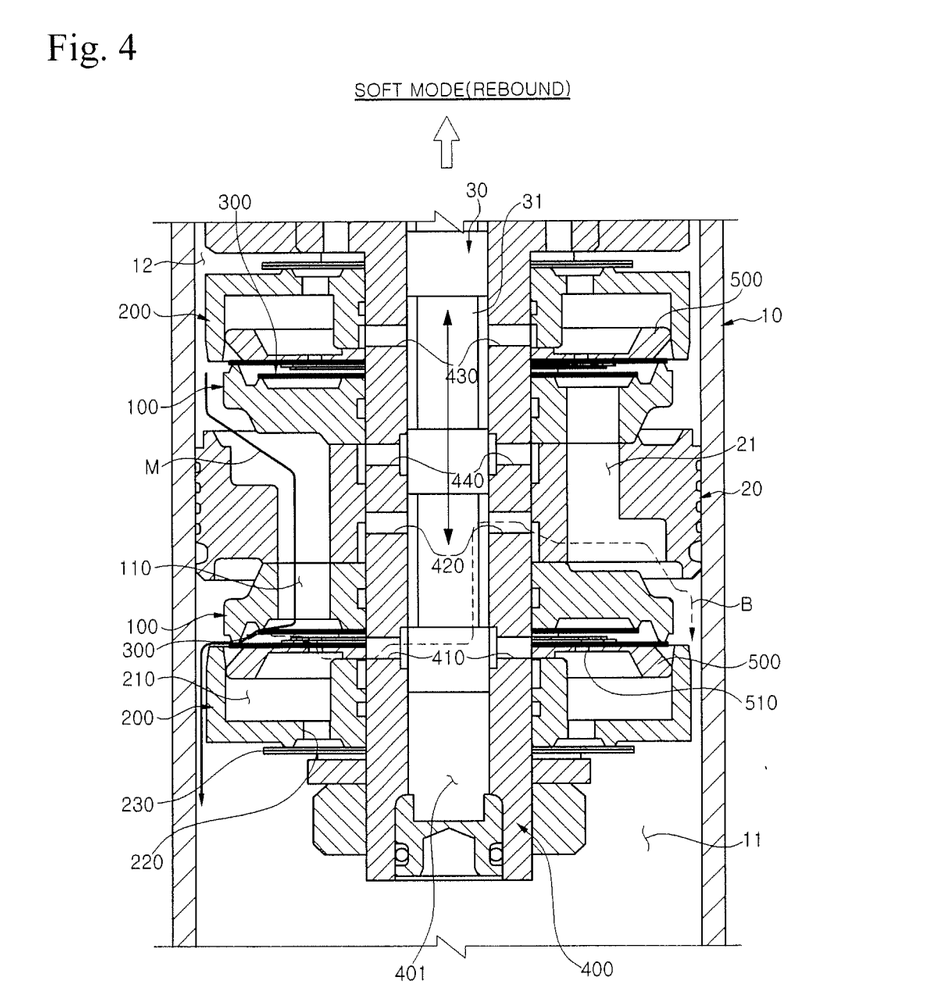
FIG. 4 is a front cross-sectional view illustrating a rebound stroke state in the soft mode of the damping force controlling shock absorber according to the present invention.

FIG. 3 is a front cross-sectional view illustrating a compression stroke state in a soft mode of the damping force controlling shock absorber according to the present invention, and FIG. 4 is a front cross-sectional view illustrating a rebound stroke state in the soft mode of the damping force controlling shock absorber according to the present invention.

Figure 5:
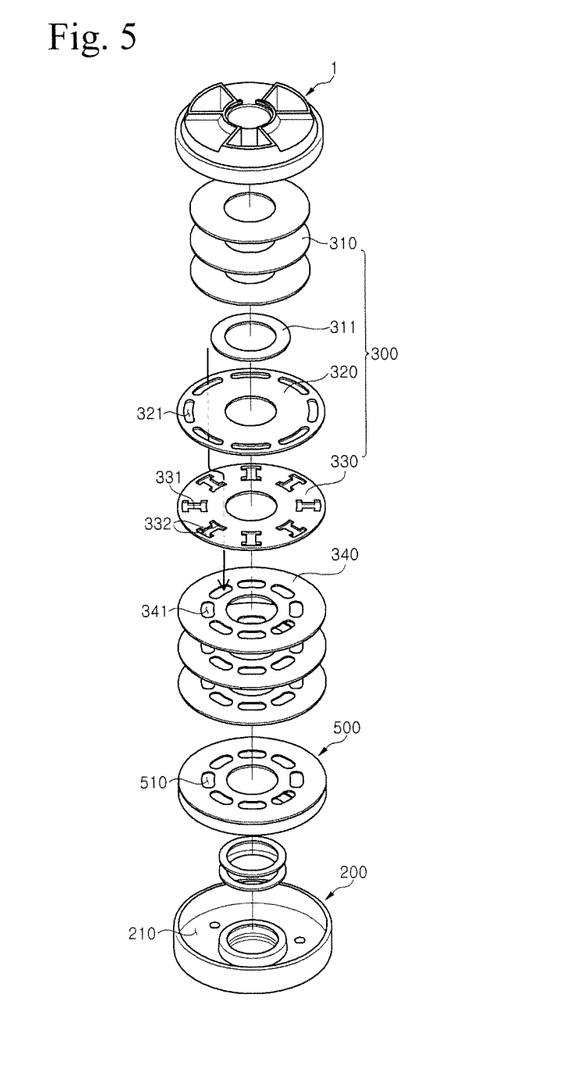
FIG. 5 is an exploded perspective view illustrating the elements of the damping force controlling shock absorber according to the present invention.

Also, FIG. 5 is an exploded perspective view illustrating the elements of the damping force controlling shock absorber according to the present invention.

Referring to FIGS. 1 to 5, the damping force controlling shock absorber according to the present invention includes a cylinder 10, a piston rod (not illustrated), a piston 20, and a solenoid.

In addition, the damping force controlling shock absorber according to the present invention includes a pair of retainers 100, a pair of housings 200, a pair of pilot valves 300, and a spool guide 400.

The cylinder 10 is made to have a cylindrical shape to form an inner space, and the cylinder 10 is filled with a working fluid (oil, etc.).

The cylinder 10 is illustrated as having a mono tube structure, but the cylinder 10 may have a twin tube structure in which two cylinders are formed.

A separate connection portion (not illustrated) for connection to a vehicle body side or a wheel side may be installed in a lower end of the cylinder 10.

One end of the cylinder 10 and one end of the piston rod may perform compression and rebound strokes in a state of being respectively connected to the vehicle body side or the wheel side of the vehicle.

One end of the piston rod is connected to the piston 20, and the other end of the piston rod extends outward from the cylinder 10 and is connected to the vehicle body side or the wheel side of the vehicle.

The piston 20 divides the inside of the cylinder 10 into a compression chamber 11 and a rebound chamber 12, which respectively correspond to an upper portion and a lower portion of the cylinder 10. A valve passage 21 is formed to vertically penetrate the piston 20.

The valve passage 21 is divided into a compression passage for moving a fluid of the compression chamber 11 to the rebound chamber 12 during the compression stroke, and a rebound passage for moving a fluid of the rebound chamber 12 to the compression chamber 11 during the rebound stroke.

A solenoid valve 30 selectively opens and closes a hard passage P and a soft passage B by elevating a spool 31 in a state of being connected to the piston rod disposed inside the cylinder 10.

To this end, the solenoid valve 30 may include an operating chamber in which the spool 31 is elevatably installed, and a coil wound around the outside of the operating chamber.

The coil forms a magnetic force by using external power and elevates the spool 31 to the soft mode or the hard mode.

The pair of retainers 100 are respectively connected to top and bottom surfaces of the piston 20. A connection passage 110 communicating with the valve passage 21 is formed to vertically penetrate the retainers 100.

The connection passage 110 is divided into a compression passage for moving a fluid of the compression chamber 11 to the rebound chamber 12 during the compression stroke, and a rebound passage for moving a fluid of the rebound chamber 12 to the compression chamber 11 during the rebound stroke.

The pair of housings 200 are respectively disposed on corresponding opposite surfaces of the retainers 100, and pilot chambers 210 are formed on the mutual corresponding surfaces of the housings 200.

The pilot chamber 210 is opened in a direction of the retainer 100, and the pilot chamber 210 is formed in a state in which the opened portion is blocked by a sealing member 500 to be described below.

A pilot passage 220 is formed to vertically penetrate the housings 200 so as to move a fluid of the pilot chamber 210 to the compression chamber 11 or the rebound chamber 12.

In addition, auxiliary valves 230 may be respectively connected to the corresponding opposite surfaces of the housings 200, and each of the auxiliary valves 230 may include a plurality of auxiliary disks that are in close contact with the pilot passage 220.

In the hard mode, the auxiliary valve 230 is opened so that the fluid passing through the pilot passage 220 is discharged to the compression chamber 11 or the rebound chamber 12.

The pilot valve 300 is in close contact with the connection passage 110 between the retainers 100 and the housings 200. The pilot valve 300 includes vertical slits formed such that the fluid passing through the connection passage 110 and the pilot chamber 210 is discharged to the outside in the hard mode.

More specifically, the pilot valve 300 may include a low disk 310, a primary pilot disk 320, a secondary pilot disk 330, and a main disk 340.

The low disk 310 may be provided with one or more low disks. The low disk 310 is in close contact with the connection passage 110 in a state in which the spool guide 400 penetrates and connects to the low disk 310.

The low disk 310 may have a disk shape with a hollow center, such that the spool guide 400 can penetrate and connect to the low disk 310.

The primary pilot disk 320 is in close contact with one surface of the low disk 310 in a state in which the spool guide 400 penetrates and connects to the primary pilot disk 320.

The primary pilot disk 320 may have a disk shape with a hollow center, such that the spool guide 400 can penetrate and connect to the primary pilot disk 320.

An edge of the primary pilot disk 320 is spaced apart from one surface of the low disk 310.

In addition, a plurality of first slits 321 are vertically formed along the edge of the primary pilot disk 320.

The plurality of first slits 321 may be formed to have a length along a circumferential direction of the primary pilot disk 320.

To this end, a spacing disk 311 may be further provided between the low disk 310 and the primary pilot disk 320.

The secondary pilot disk 330 is in close contact with one surface of the primary pilot disk 320 in a state in which the spool guide 400 penetrates and connects to the secondary pilot disk 330.

The secondary pilot disk 330 may have a disk shape with a hollow center, such that the spool guide 400 can penetrate and connect to the secondary pilot disk 330.

In addition, a plurality of second slits 331 are vertically formed along the edge of the secondary pilot disk 330, so as to communicate with the first slits 321 in the hard mode.

The second slits 331 guide the fluid moved through cut-away portions of the first slits 321 toward the side and then guide the fluid to third slits 341 to be described below.

The second slits 331 may be formed to have a length along a center direction of the secondary pilot disk 330.

In this case, two cut-away portions 332 having a larger width than a central portion of the second slit 331 may be formed at both ends of the second slit 331 in a longitudinal direction.

The fluid is introduced from the first slit 321 to the cut-away portion 332 disposed in an edge direction of the secondary pilot disk 330.

On the other hand, the cut-away portion 332 disposed in the center direction of the secondary pilot disk 330 discharges the fluid introduced from the first slit 321 to the outside.

In this manner, the secondary pilot disk 330 may variably adjust an amount of the fluid moving to the pilot chamber 210 through width adjustment of the second slit 331.

The main disk 340 may be provided with one or more main disks. The main disk 340 is in close contact with one surface of the secondary pilot disk 330 in a state in which the spool guide 400 penetrates and connects to the main disk 340.

The main disk 340 may have a disk shape with a hollow center, such that the spool guide 400 can penetrate and connect to the main disk 340. The main disk 340 may have the same diameter as the secondary pilot disk 330.

In addition, a plurality of third slits 341 are vertically formed along an edge of the main disk 340, so as to communicate with the second slits 331 and the pilot chamber 210 in the hard mode.

The third slits 341 may be formed to have a length along a circumferential direction of the main disk 340.

The first slits 321 and the third slits 341 may be alternately formed with respect to the secondary pilot disks 330.

The spool guide 400 penetrates and connects to the retainers 100, the housings 200, and the pilot valves 300, and guides the spool 31 in a state of surrounding the outside of the spool 31.

A hollow 401 is vertically formed inside the spool guide 400 such that the spool 31 is slidably movable.

Bypass passages 410, 420, 430, and 440 are formed in the spool guide 400 such that the fluid passing through the first to third slits 321, 331, and 341 and the pilot chamber 210 are discharged to the outside through the inside of the spool guide 400 and the valve passage 21 in the soft mode.

The bypass passages 410, 420, 430, and 440 may include four passages, i.e., a first compression passage 410, a second compression passage 420, a first rebound passage 430, and a second rebound passage 440.

The first compression passage 410 is horizontally formed in the spool guide 400 and is formed in a direction of the compression chamber 11 with respect to the piston 20.

The first compression passage 410 introduces the fluid passing through the pilot chamber 210 into the hollow 401 of the spool guide 400 in the rebound stroke.

The second compression passage 420 is horizontally formed in the spool guide 400. The second compression passage 420 discharges the fluid passing through the first compression passage 410 and the spool guide 400 to the outside through the valve passage 21.

The second compression passage 420 is formed spaced apart between the first compression passage 410 and the first rebound passage 430.

The first rebound passage 430 is horizontally formed in the spool guide 400 and is formed in a direction of the rebound chamber 12 with respect to the piston 20.

The first rebound passage 430 introduces the fluid passing through the pilot chamber 210 into the spool guide 400 in the compression stroke.

The second rebound passage 440 is horizontally formed in the spool guide 400. The second rebound passage 440 discharges the fluid passing through the first rebound passage 430 and the spool guide 400 to the outside through the valve passage 21.

The second rebound passage 440 is formed between the first compression passage 410 and the first rebound passage 430.

Sealing members 500 are further provided between the pilot valves 300 and the housings 200. The sealing members 500 are installed movably in a state of blocking the pilot chambers 210.

The sealing members 500 may be installed in a state in which edges of the sealing members 500 are in close contact with side surfaces of the pilot chamber 210.

An introduction passage 510 is formed in the sealing members 500 such that the fluid passing through the first to third slits 321, 331, and 341 are moved to the pilot chamber 210.

The introduction passage 510 moves the fluid passing through the third slit 341 to the pilot chamber 210 in the hard mode.

Hereinafter, the operation of the damping force controlling shock absorber according to the present invention will be described with reference to FIGS. 1 to 4.

First, in a case where the compression and rebound strokes are performed while the solenoid is operating in the hard mode, the fluid is moved through the main passage M and the hard passage P as illustrated in FIGS. 1 and 2.

More specifically, the fluid of the compression chamber 11 or the rebound chamber 12 is introduced through the valve passage 21 of the piston 20.

Then, the fluid is discharged to the compression chamber 11 or the rebound chamber 12 through the connection passage 110. In this process, the pilot valve 300 closely contacted in a discharge direction of the connection passage 110 is opened to generate a damping force.

At the same time, the fluid introduced into the valve passage 21 is introduced into the pilot chamber 210 through the connection passage 110, the first slit 321, the second slit 331, the third slit 341, and the introduction passage 510.

Then, the fluid introduced into the pilot chamber 210 is discharged to the compression chamber 11 or the rebound chamber 12 through the pilot passage 220. In this process, the auxiliary valve 230 that is in close contact with the pilot passage 220 is opened to generate a damping force.

On the other hand, in a case where the compression and rebound strokes are performed while the solenoid is operating in the soft mode, the fluid is moved through the main passage M and the soft passage B as illustrated in FIGS. 3 and 4.

More specifically, the fluid of the compression chamber 11 or the rebound chamber 12 is introduced through the valve passage 21 of the piston 20.

Then, the fluid is discharged to the compression chamber 11 or the rebound chamber 12 through the connection passage 110. In this process, the pilot valve 300 that is in close contact with a discharge side of the connection passage 110 is opened to generate a damping force.

At the same time, the fluid introduced into the valve passage 21 is introduced into the pilot chamber 210 through the connection passage 110, the first slit 321, the second slit 331, the third slit 341, and the introduction passage 510.

Then, the fluid introduced into the pilot chamber 210 is moved to the side portion and is then introduced into the hollow 401 of the spool guide 400 through the first compression passage 410 or the first rebound passage 430.

Then, the fluid introduced into the hollow 40 I of the spool guide 400 is I 0 discharged to the second compression passage 420 or the second rebound passage 440 and is discharged to the compression chamber 11 or the rebound chamber 12 through the valve passage 21 of the compression and rebound direction.

Consequently, the hard passage P may be formed through connection of the disks where the slits are formed, and the soft passage B may be formed by using four passages formed in the compression and rebound directions of the spool guide 400. Therefore, It is possible to simplify the passage structure, reduce production dispersion of the shock absorbers, and improve productivity of the shock absorbers.

The damping force controlling shock absorbers according to embodiments of the present invention have been described, but it is obvious that various modifications can be made thereto without departing from the scope of the present invention.

Therefore, the scope of the present invention should not be limited to the embodiments described above, and will be determined by the appended claims and equivalents thereof.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: cylinder | 11: compression chamber |
| 12: rebound chamber | 20: piston |
| 21: valve passage | 30: solenoid valve |
| 31: spool | 100: retainer |
| 110: connection passage | 200: housing |
| 210: pilot chamber | 220: pilot passage |
| 230: auxiliary valve | 300: pilot valve |
| 310: low disk | 311: spacing disk |
| 320: primary pilot disk | 321: first slit |
| 330: secondary pilot disk | 331: second slit |
| 332: cut-away portion | 340: main disk |
| 341: third slit | 400: spool guide |
| 401: hollow | 410: first compression passage |
| 420: second compression passage | 430: first rebound passage |
| 440: second rebound passage | 500: sealing member |
| 510: introduction passage | M: main passage |
| P: hard passage | B: soft passage |

What is claimed is:

1. A damping force controlling shock absorber, which includes a piston rod configured to perform compression and rebound strokes within a cylinder, a piston connected to the piston rod to divide the cylinder into a compression chamber and a rebound chamber, a main passage being formed to vertically penetrate the piston, and a solenoid configured to elevate a spool by a magnetic force between the piston rod and the piston, the damping force controlling shock absorber comprising:

retainers respectively connected to top and bottom surfaces of the piston, a connection passage communicating with the main passage being formed to vertically penetrate the retainers;

housings respectively disposed on corresponding opposite surfaces of the retainers to form pilot chambers on mutual corresponding surfaces of the housings, a pilot passage being formed to vertically penetrate the housings so as to communicate the pilot chambers with the outside;

pilot valves that are in contact with the connection passage between the retainers and the housings to generate a main damping force, wherein the pilot valves are opened to discharge a fluid passing through the connection passage directly to the compression chamber or the rebound chamber; and a spool guide that penetrates and connects to the retainers, the housings, and the pilot valves and guides the spool in a state of surrounding the outside of the spool, wherein slits are formed to vertically penetrate the pilot valves such that a fluid passing through the connection passage and one of the pilot chambers is discharged to the outside in a hard mode, and bypass passages are formed in the spool guide such that a fluid passing through the slits and one of the pilot chambers is discharged to the outside through the inside of the spool guide and a valve passage in a soft mode.

2. The damping force controlling shock absorber according to claim 1, wherein the bypass passages comprise:
   a first compression passage formed in a direction of the compression chamber with respect to the piston such that a fluid passing through one of the pilot chambers is introduced into the spool guide in the rebound stroke;
   a second compression passage formed such that a fluid passing through the first compression passage and the inside of the spool guide is discharged to the outside through the valve passage;
   a first rebound passage formed in a direction of the rebound chamber with respect to the piston such that a fluid passing through one of the pilot chambers is introduced into the spool guide in the compression stroke; and
   a second rebound passage formed such that a fluid passing through the first rebound passage and the inside of the spool guide is discharged to the outside through the valve passage.

3. The damping force controlling shock absorber according to claim 2, wherein the second compression passage and the second rebound passage are formed between the first compression passage and the first rebound passage.

4. The damping force controlling shock absorber according to claim 1, wherein the pilot valves comprise:
   a low disk that is in contact with the connection passage in a state in which the spool guide penetrates and connects to the low disk;
   a primary pilot disk that is in contact with the low disk in a state in which the spool guide penetrates and connects to the primary pilot disk, first slits being vertically formed along an edge of the primary pilot disk which is spaced apart from the low disk;
   a secondary pilot disk that is in contact with the primary pilot disk in a state in which the spool guide penetrates and connects to the secondary pilot disk, second slits being vertically formed along an edge of the secondary pilot disk so as to communicate with the first slits in the hard mode; and
   a main disk that is in contact with the secondary pilot disk in a state in which the spool guide penetrates and connects to the main disk, third slits being vertically formed along an edge of the main disk so as to communicate with the second slits and one of the pilot chambers in the hard mode.

5. The damping force controlling shock absorber according to claim 4, wherein the first slits and the third slits are alternately formed with respect to the secondary pilot disks, and
   the second slits guide a fluid moved through the first slits toward a side and then guide the fluid to third slits.

6. The damping force controlling shock absorber according to claim 1, further comprising sealing members provided between the pilot valves and the housings such that the sealing members are installed movably in a state of blocking the pilot chambers,
   wherein an introduction passage is formed in the sealing members such that a fluid passing through the slits is moved to the pilot chamber.

7. The damping force controlling shock absorber according to claim 1, further comprising auxiliary valves connected to the corresponding opposite surfaces of the housings,
   wherein the auxiliary valves are in contact with the slits and are opened in the hard mode such that the fluid passing through the slits is discharged to the outside.

* * * * *